No. 845,044. PATENTED FEB. 26, 1907.
W. J. BALDWIN.
DUST SEPARATING BLOWER.
APPLICATION FILED JUNE 3, 1903.

Witnesses:
Inventor
William J. Baldwin
By his Attorney

UNITED STATES PATENT OFFICE.

WILLIAM J. BALDWIN, OF NEW YORK, N. Y.

DUST-SEPARATING BLOWER.

No. 845,044.  Specification of Letters Patent.  Patented Feb. 26, 1907.

Application filed June 3, 1903. Serial No. 159,918.

*To all whom it may concern:*

Be it known that I, WILLIAM J. BALDWIN, a citizen of the United States of America, and a resident of the borough of Brooklyn, in the city of New York, State of New York, have invented certain new and useful Improvements in Dust-Separating Blowers, of which the following is a specification.

This invention relates to improvements in dust-separating blowers.

It is especially the purpose of this invention to provide a blower for ventilation and other purposes whereby much of the larger particles and those which are the most objectionable on sanitary grounds will be separated from the air without the use of the large, ponderous, and fragile filtering-screens now generally employed to filter the air. Such screens are not only of great size, inconvenient, and expensive in themselves, but require the use of large rooms or passages in buildings to set them in, whereby space needed for other purposes is taken up, for such screens are only practicable with air-currents of low velocity, and this low velocity is attained by making the cross-areas of the passage or chambers in which the screens are set very large.

In the present invention the filtering-diaphragm is set in the immediate vicinity of the blowing-engine, where the velocity of the air is high, and preferably in the blower-case, so that the dust and a portion of the air is blown through the said filtering-diaphragm, while the remaining portion of the air, freed from the dust, is delivered to the ducts which lead to the place of use. The blower is also provided with means which catch and deposit the dust which was blown through the diaphragm and for mingling the air which was also blown therethrough after the dust is deposited with the body of air from which the dust was originally screened. The process of separating the dust from the air is therefore the reverse of that now employed in that the dust is forced through the screen, whereas in existing methods it is arrested by the screen, and the placing of the diaphragm, which is preferably a wire screen, in the high-velocity air enables a screen of small area to screen a large volume of air and dispenses with the large filtering-screens now in use, as above mentioned.

Figure 1:
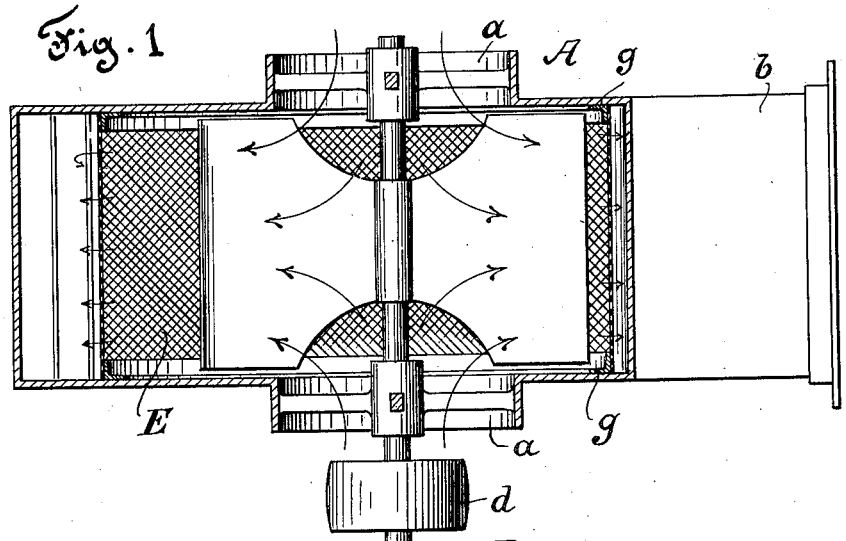
Figure 2:
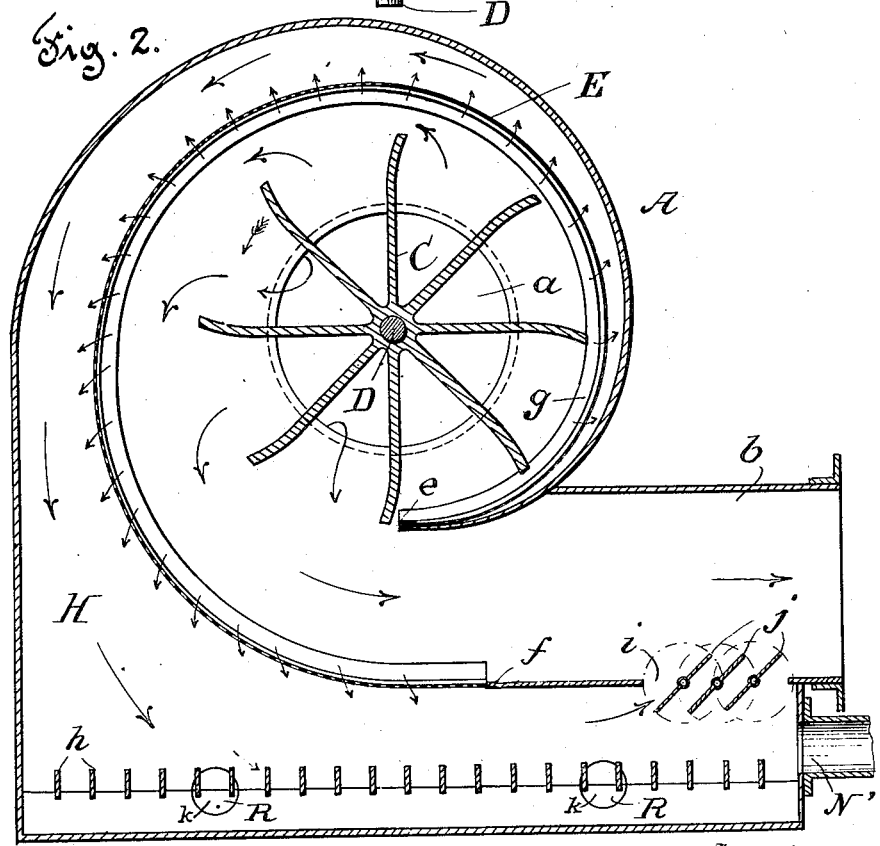

As the process of separating the fine suspended particles has been described and claimed in another of my applications for United States Letters Patent, Serial No. 159,917, filed June 3, 1903, I shall hereinafter describe and claim only the apparatus, referring to the accompanying drawings to aid the description, Figure 1 being a horizontal section and plan of my blower, and Fig. 2 a vertical section of the blower.

A is the blower-case, provided with the usual central air-inlets $a$ and with the tangential discharge $b$ and containing the centrifugal fan C on the shaft D, which is mounted in the usual manner in the blower-case A and is driven by pulley $d$ from a suitable motor. The case A is preferably somewhat larger diametrically than the common centrifugal blower-cases in order to afford room for the dust separating or filtering screen and for the dust-collecting chamber. Said screen E is preferably of wire mesh of suitable fineness, is situated adjacent to the fan-blades and where the velocity of the air is relatively high, is preferably shaped as a volute eccentric to the volute part of the case A, as shown, being secured to said case at its inner edge $e$, and thence passing around and being fastened to the wall $f$ of the discharge $b$. Said screen E is fixed in case A in the desired volute shape in any suitable manner, as by being fastened to the volute flanges $g$ $g$ on the heads of said case. A dust-settling chamber H is preferably provided outside of the screen E and is preferably constructed, as shown, by extending the walls of the case A downwardly to form a water-chamber below the said wall $f$ of the discharge $b$, and I prefer to place transverse gratings $h$ in said chamber H to aid in arresting the dust, said gratings projecting a little above and a little below the water-level. Said gratings $h$ not only aid in catching the dust, but also prevent the excessive agitation of the water by the rapidly-moving air. Near the front end of the said chamber H an opening (or openings) $i$ is provided into the discharge $b$, which said opening $i$ is provided with dampers $j$ $j$, adjustable from outside the case A, whereby the delivery of the air from the chamber H into the discharge $b$ is controlled as desired.

In operation the dust-laden air being blown at high velocity against the screen E the particles of dust and a greater or less portion of the air passes through the screen into settling-chamber H, while the remaining portion of the air, freed from dust, passes to the discharge and thence to the place of use. The dust-laden air which passed through the screen E sweeping down toward the water in the chamber H, the dust particles are arrested by the gratings and caught by the water, while the air, now freed from dust, flows on and upward into the discharge through the dampers j at a point a little in front of the screen E, where it mingles with the air from which the dust had originally been filtered, or, if preferred, it may be allowed to escape by an outlet N without being mingled with the air from which the dust had been originally separated. In fact, in some cases I may allow the air which passed through the screen with the dust to escape directly into atmosphere, and the proportion of air which passes through the screen is regulated by the opening or closing of the dampers j and the opening N, which is provided with a suitable valve.

Orifices k may be provided for filling and cleaning the water-chamber.

Now, having described my improvements, I claim as my invention—

1. The combination in a dust-separating blower, of a centrifugal fan, a fan-chamber having a permeable peripheral wall, and a dust-collecting chamber ouside said wall, substantially as described.

2. The combination in air-filtering apparatus of a blower provided with an air inlet and outlet and containing a permeable wall adapted to permit of the passage of dust particles, a dust-collecting chamber communicating with the said outlet, and means for controlling the communication between said chamber, and said outlet, substantially as described.

3. In air-filtering apparatus, a self-contained blower characterized by the following elements combined in one structure; an air-propelling device and a case therefor provided with an inlet and an outlet, a permeable diaphragm in the case in the path of high-velocity air, a dust-collecting chamber in said case outside of said diaphragm, adapted to be put into communication with said outlet, and a receptacle for liquid in said chamber, substantially as described.

4. In air-filtering apparatus, a self-contained blower characterized by the following elements combined in one structure; an air-propelling device and a case therefor provided with an inlet and an outlet, a permeable diaphragm in the case in the path of the high-velocity air, and a dust-collecting chamber outside of said diaphragm adapted to be put into communication with said outlet, substantially as described.

5. The combination in air-filtering apparatus, of a blower, a permeable diaphragm adjacent to the blower and in the path of the high-velocity air, whereby the dust and part of the air is driven through said diaphragm, a discharge from the inner side of said diaphragm for the remaining part of the air, a dust-collecting chamber on the outside of said diaphragm, and an orifice connecting said chamber with said discharge, substantially as described.

6. The combination in air-filtering apparatus, of a blower, a permeable diaphragm adjacent to the blower and in the path of the high-velocity air, whereby the dust and part of the air is forced through said diaphragm, a discharge from the inner side of said diaphragm for the remaining part of the air, a dust-collecting chamber on the outside of said diaphragm, and an orifice provided with an adjustable valve connecting said chamber with said discharge, substantially as described.

7. The combination in air-filtering apparatus, of a blower and case therefor, a permeable diaphragm in the path of the high-velocity air, a dust-collecting chamber outside of the said diaphragm adapted to contain a collecting liquid, and a grid to arrest the dust in said chamber, substantially as described.

Signed at New York city this 23d day of May, 1903.

WILLIAM J. BALDWIN.

Witnesses:
DAVID WALTER BROWN,
CHARLES WEIN.